United States Patent
Batterman

[15] 3,653,373
[45] Apr. 4, 1972

[54] APPARATUS FOR ACOUSTICALLY DETERMINING PERIODONTAL HEALTH

[72] Inventor: Steven C. Batterman, 109 Charlann Circle, Cherry Hill, N.J. 08034

[22] Filed: Jan. 19, 1970

[21] Appl. No.: 3,938

[52] U.S. Cl. ............................................128/2 K, 73/67.2
[51] Int. Cl. ..............................................A61b 5/00
[58] Field of Search ................128/2, 24; 73/67.1, 67.2

[56] References Cited

UNITED STATES PATENTS

| | | | |
|---|---|---|---|
| 3,094,115 | 6/1963 | Polin | 128/2.1 |
| 3,106,838 | 10/1963 | Crooks | 73/67.2 |
| 3,477,422 | 11/1969 | Jurist, Jr. et al. | 128/2 |
| 2,800,895 | 7/1957 | Torricelli | 128/2 |
| 2,895,094 | 7/1959 | Seiler | 73/67.2 X |
| 3,550,434 | 12/1970 | Schroeer et al. | 73/67.2 |
| 2,532,915 | 12/1950 | Horner | 128/2 |
| 2,625,152 | 1/1953 | Frohring | 128/2 |
| 3,438,493 | 4/1969 | Goble | 73/67.2 X |
| 3,503,501 | 3/1970 | Seaborn | 73/67.2 X |

FOREIGN PATENTS OR APPLICATIONS

| | | | |
|---|---|---|---|
| 974,249 | 9/1950 | France | 73/67.1 |

*Primary Examiner*—Richard A. Gaudet
*Assistant Examiner*—Kyle L. Howell
*Attorney*—Howard I. Forman

[57] ABSTRACT

A pre-determined exciting force is imparted to a patient's teeth to cause them to emit a measurable sound or radiation response. The response is picked up by a microphone located inside the oral cavity immediately behind the teeth, and then is conveyed to a frequency analyzer positioned near the patient. Optionally, a sound level recorder can be connected to the frequency analyzer so as to automatically record the sound spectra on preprinted recording paper. Since the emitted sound is a function of the frequency response of the teeth, which in turn depends upon the rheology and hence the health of the periodontium or teeth supporting structures, periodic checks of the teeth's frequency response can provide a record of the changes in the patient's periodontal health.

7 Claims, 3 Drawing Figures

Patented April 4, 1972
3,653,373
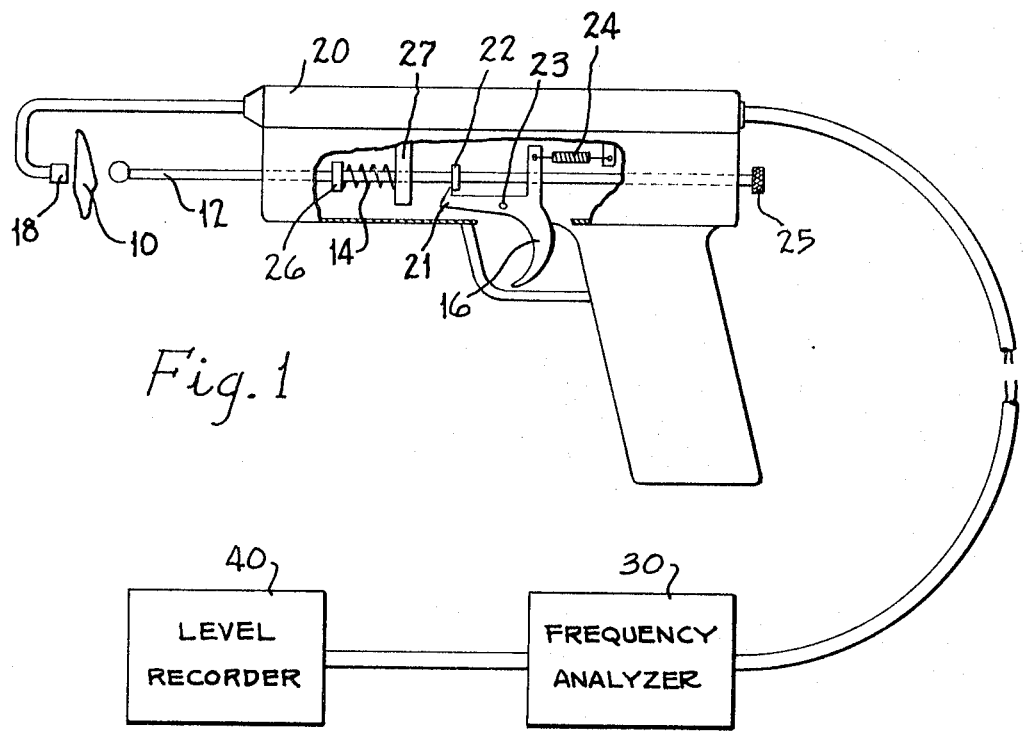
Fig. 1
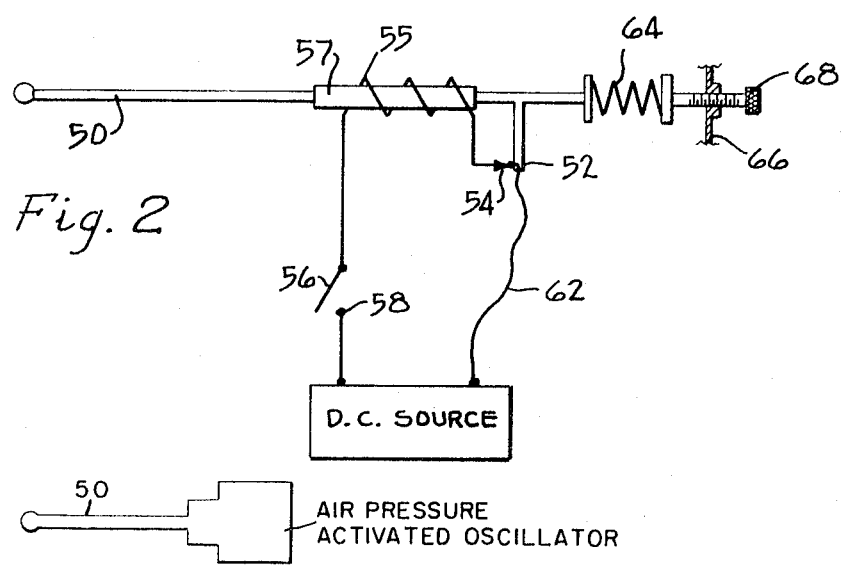
Fig. 2
Fig. 3
INVENTOR
STEVEN C. BATTERMAN

APPARATUS FOR ACOUSTICALLY DETERMINING PERIODONTAL HEALTH

The present invention concerns an apparatus for determining periodontal health. The apparatus may be described as an audio or acoustic periodontometer, the coined terminology describing my novel invention by which the periodontal health of a patient may be determined by measuring and recording the audible sounds given off by teeth that are caused to vibrate upon receiving sharp blows.

In particular, the invention involves the application of a controlled shock loading and/or vibration to the teeth, and measuring the sound emitted in response to the shock or vibration. Since that sound is a function of the frequency response of the teeth, which in turn depends upon the rheology (and hence the health) of the tooth supporting structures, measurement of the sound is in turn a measurement of the periodontal health.

The principal object of the invention is to provide a means for the non-destructive testing of the health of the periodontal and other supporting tissues of the teeth. A further object is to apply a force which will set teeth to vibrating and emitting sound therefrom, the amounts depending upon the firmness of the teeth's support in the gums and jawbone, and picking up the sound for recording and analyzing the frequency of same, without employing any attachments to the teeth being tested.

The underlying principle of the testing method of the present invention is the application of mechanical signature analysis techniques to teeth. Sound and vibration signals picked up by the ear have been used for many years to judge the internal condition of machinery and various building or other structures. Recently, the mechanical signature analysis technique has undergone scientific development leading to the use of external sound and vibration signals to diagnose internal conditions or malfunctions and to detect incipient failures. By such analysis even passive structures, e.g. an engine block, an automobile frame, a package of electronics, can be mechanically excited to produce a sound signature which is characteristic for a given internal condition. (Cf. "Mechanical Signature Analysis, A New Tool for Product Assurance and Early Fault Detection", by B. Weichbrodt, June, 1968, Report No. 68-e-197 of the Mechanical Engineering Laboratory, General Electric Company's Research and Development Center, Schnectady, N. Y.).

As Polin has pointed out in his U.S. Pat. No. 3,094,115, an indication of the state of well being of the oral cavity and its bony structure may be found in the degree of tightness of the teeth. Increases in tooth mobility have long been known to be clear-cut evidence of the existence and growth of periodontal disease. Prior to Polin it had been known to apply a stated force to the teeth to cause them to bend away from the direction of the applied force, and measuring the degree of change from the resting position of the teeth in units of mobility (i.e. displacement). Another known means for measuring tooth mobility was to set a tooth into vibration by touching an oscillating probe to it, and measuring the amplitude of the vibrating tooth at the driven frequency. Both of these techniques have, as described by Polin, objectionable characteristics in that: (a) the subject must be held in a rigid harness; (b) the point on the tooth at which the measuring force is applied must be accurately stated in order to get reproducible results and, because of the variations in the shape of the teeth, comparative tests are difficult and non-precise; (c) the whole process is extremely time-consuming; (d) measuring the amplitude of vibrating teeth is very sensitive to the pressure applied and so reproducibility is difficult; and (e) in measuring amplitude the resonant frequencies in the tooth are error factors.

Polin measures departures in amplitude and frequency of a signal received at his probe, which is in actual contact with the patient's teeth, from the characteristics of the input signal. The present invention needs no probe, and nothing need be molded to the patient's teeth. Moreover, the present invention is not concerned with the amplitude of vibration, and the mobility of teeth per se is not measured; instead, it is resonant frequency that is measured, and this is achieved without transducers attached to or in contact with the teeth. In accordance with the present invention, the changes in the resonant frequencies of the patient's periodontium are recorded as a measure of the health of his teeth and gums. The periodontium is the supporting mechanism of the teeth, consisting of the periodontal ligament, the bony structure in which the teeth are positioned, and the gum tissues. As this supporting mechanism undergoes changes in its ability to hold the teeth in firm position therein there occur measurable changes in the resonant frequencies which can be detected with the aid of a suitable microphone and a frequency analyzer. Thus, by imparting an exciting force to the teeth which causes the teeth to emit a measurable sound or radiation response, and recording the changes in such sounds from time to time, it is possible to trace the changes in the periodontium that occur and thus evaluate the patient's periodontal health as rheological changes in the tooth and gum supporting structure take place.

The apparatus of the present invention can take any of several alternate forms. The essential requirements are an oscillating means for imparting pressure to the teeth and a condenser microphone for picking up the resonant response of the teeth. In addition, electronic instrumentation is required for measuring, recording and helping in interpreting the data.

In the accompanying drawings, a suitable spring-loaded apparatus is illustrated (FIG. 1 shows a "single-shot" device) which will simply and adequately apply the tooth exciting force. Other tooth vibration means (FIG. 3) are available which are operated by air pressure. Preferably, however, the force should be supplied by a continuous loading, continuous oscillating device (such as is illustratively shown in FIG. 2). Once the blow is imparted which sets the teeth to vibrating so that the response of the teeth to the exciting force is picked up on the microphone, the response is transmitted to a frequency analyzer having a microphone input and an output for a level recorder which records sound level vs. frequency.

Referring to the drawings, a tooth 10 is schematically shown (as it exists in the oral cavity, but with all other parts of the cavity and the human skull stripped away). Resting adjacent the facial surface of the tooth is a plunger 12 which is spring-loaded as at 14 and released fro actuation under that spring pressure by a trigger 16. A microphone 18 (preferably a condenser, although piezoelectric or dynamic microphones will function satisfactorily) is situated on the lingual side of the tooth. Optionally, but preferably, the supporting means for the microphone can be integrated, as by means of the housing 20, with the plunger and trigger mechanism so as to form a single unit as shown. The electricity conducting wires from the condenser microphone 18 extend through housing 20 into a frequency analyzer 30 (such as the Brüel & Kjaer Type 2107, Brukja, Copenhagen) which serves to measure the sound spectra. The arrangement is connected to a level recorder 40 (such as the Brüel & Kjaer type 2305) which enables sound level or time records to be recorded automatically on preprinted recording paper.

FIG. 3 diagrammatically shows an air pressure activated oscillator for driving plunge 50.

In operation, after the instrument is positioned as shown in the drawing, trigger 16 is released and, under the influence of spring 14, plunger 12 is caused to strike tooth 10 with a measured force. The tooth is thereby caused to vibrate, the amount of vibration depending upon the extent to which the tooth is secured in its bony emplacement, and the sound response brought on by the vibration is picked up by the microphone 18 and transmitted to the frequency analyzer 30 and, optionally, the level recorder 40. The recording of the resonant frequency developed by giving the tooth a measured blow amounts to a signature analysis of the sound produced thereby, and (by thus detecting changes in the resonant frequencies of the periodontium) in turn measures the rheology of the tooth. A continuous recording of the produced sounds is possible, as different teeth are excited to vibrate, thereby forming a complete sound spectrogram of the patient's entire set of teeth. By making such recordings from time to time the dentist can observe whether any marked rheological changes are taking place, and seek to treat the condition accordingly, much in the same way that a medical doctor relies upon periodic electrocardiograms of a patient to determine whether changes in the patient's heart have taken place over a period of time.

The actual trigger mechanism in FIG. 1 is, of course, an entirely optional arrangement which is diagrammed (in cocked position) purely for illustrative purposes. Obviously, other suitable arrangements can readily be devised without departing from the spirit of the invention. In the device shown, however, it may suffice to explain that preparatory to use the plunger cocking handle 25 is pulled rearwardly so as to cause compression spring retaining member 26 to compress spring 14 against the abutment 27 which depends from housing 20. This rearward movement of plunger 12 causes latch 21 of the trigger to engage lock flange 22 so as to prevent forward movement of the plunger. Tension spring 24 serves to hold the trigger in position so that latch 21 remains in position to engage lock flange 22 against the forward drive impetus which spring 14 tends to give the entire assembly of plunger 12. When trigger 16 is pulled rearwardly it turns about pivot 23 in a counter-clockwise direction, pulling latch 21 downward and out of engagement with lock flange 22, and under the influence of spring 14 the plunger moves forward (from right to left in the drawing), so that it strikes tooth 10.

In the continuous or repetitive oscillating form of the apparatus, as illustrated diagramatically in FIG. 2 (in extended or un-cocked position), several blows may be given the tooth in quick succession. In this arrangement there is provided a piston 50 (which corresponds to plunger 12 in FIG. 1) which has secured thereto an armature member 57 having an electromagnetic coil 55. One end of that coil comprises part of an electrical switch, as at 54; the other end of the coil comprises part of another electrical switch which can function like a make-break button or trigger mechanism as at 56. Leads from a source of direct current are provided, one being 58 which is contacted by the trigger 56 to close the circuit, and another being 62 which is a movable conductor that feeds electrical current to a member 52 that depends from piston 50 and serves as a switch contact element. Thus, with 52 and 54 in contact with each other, whenever the trigger or button 56 is depressed so as to make contact with 58 the circuit is closed and coil 57 is energized so as to cause piston 50 to be given a thrust (from left to right in the drawing). This thrust loads a force onto compression spring 64 which then is able to drive the piston in the opposite direction. Adjusting means are provided for regulating the strength of the force provided by the compression spring, in the form of a regulating screw 68 that is threadedly secured to the housing which is shown fragmentarily at 66. By thus lengthening the stretch distance of the spring a greater force can be provided; conversely, by shortening the distance of stretch a weaker force can be provided.

The invention will operate under either sonic or ultra-sonic conditions, the difference between the two being merely the difference in the frequency ranges employed. Sonic conditions involve the use of 15 to less than 20,000 cycles/sec. (Hz), whereas ultra-sonic conditions are over 20,000 cycles/sec. (Hz).

Just as other modes or means of supplying an exciting force to the teeth and various types of microphones have been indicated as being useful in this invention, other means and procedures unquestionably can be substituted for the invention as herein illustrated and described without departing from its spirit and scope. Accordingly, I believe it appropriate that my invention be limited only by the claims which are set forth below.

I claim:

1. A periodontometric instrument for non-destructively measuring the periodontal health of a patient in terms of the degree of firmness of his teeth in his periodontium, comprising a housing, a microphone secured to and extending from said housing so as to be readily adapted to be positioned adjacent to but not in contact with the lingual side of a patient's tooth, a plunger means movably mounted in said housing and extending therefrom with one end of the plunger adapted to be positioned adjacent the facial surface of the same tooth so that when released from an energy-loaded position it moves rapidly to strike a measured blow on the tooth thereby to cause the tooth to vibrate and emit sounds therefrom which can be picked up by said microphone, and a frequency analyzer means attached to said microphone for measuring the frequency of sounds thus picked up, the degree of resonant frequency thus determined being useful for comparison with other such determinations from time to time so as to identify changes in the resonant frequencies of the periodontium, the measurement of such changes amounting to a measurement of the changes in the degree of firmness of the tooth in its periodontium.

2. The instrument of claim 1 additionally incorporating a sound level recorder electrically connected to said frequency analyzer so as to receive and record the level of sounds which are picked up said microphone, transmitted to said frequency analyzer and then to said recorder.

3. The instrument of claim 1 in which the plunger is spring-loaded.

4. The instrument of claim 1 in which the plunger is activated by air pressure.

5. The instrument of claim 1 in which the housing has the general configuration of a pistol containing a trigger means for cocking and firing the plunger, an abutment depending from said housing, a spring retaining member depending from the plunger, a compression spring surrounding the plunger secured at one end to said retaining member and having its movement restricted at its other end by said abutment, said trigger means including a trigger having a finger grip, a latch member and a tension spring holding member pivotably secured to said housing, a lock flange depending from said plunger rearwardly of said abutment so as to be releasably engageable by said trigger's latch member, a tension spring secured at one end to said housing and at its other end to said trigger's tension spring holding member, and a plunger cocking handle for pulling the plunger rearwardly away from the patient's tooth thereby to load the plunger against said compression spring and enable said lock flange on the plunger to be positioned rearwardly a sufficient distance to become engaged by said trigger's latch member and held there by the force of said tension spring until such time as an operator's rearward pressure on said trigger's finger grip overcomes that force sufficiently to disengage the latched trigger and enable the plunger to plunge forward rapidly into contact with the patient's tooth with the aid of the energy supplied by the released compression spring.

6. A periodontometric instrument for non-destructively measuring the periodontal health of a patient in terms of the degree of firmness of his teeth in his periodontium, comprising a housing, a microphone secured to and extending from said housing so as to be readily adapted to be positioned adjacent to but not in contact with the lingual side of the patient's tooth, a piston means including a plunger mounted in said housing so that one end of the piston means is adapted to be positioned adjacent the facial surface of the same tooth and including means providing oscillatory movement of said plunger so that when released said plunger moves rapidly to strike a succession of measured blows on the tooth thereby to cause the tooth to vibrate and emit sounds therefrom which can be picked up by said microphone, a frequency analyzer means attached to said microphone for measuring the frequency of the sounds thus picked up, said means providing oscillatory movement includes an armature member secured to and movable with said piston, an electrical circuit make-break mechanism, an electromagnetic coil component of said armature member having a first end which serves as part of an electrical switch and having its other end connected to said make-break mechanism, an electrical switch contact element attached to said piston which element together with said electromagnetic coil component's first end forms a complete electrical on-off switch mechanism, electrical wire leads extending from said make-break mechanism and from said electrical switch mechanism for connection to a source of direct electrical current, and a compression spring having one end attached to said piston and the other end attached to said housing, whereby upon connecting the wire leads to an electric current source and closing said make-break mechanism the electromagnetic coil is energized thereby to turn on the electrical switch mechanism and cause the piston to be given a thrust in a direction away from the patient's tooth to load a force onto the compression spring and at the same time open the switch mechanism so as to de-energize the coil and permit the load compression spring to drive the piston in the opposite direction into contact with the patient's tooth and simultaneously to close the switch mechanism again, the piston thereby being made to oscillate back and forth into and out of contact with the patient's tooth as long as the make-break mechanism is caused to close the electrical circuit.

7. The instrument of claim 6 additionally incorporating a regulating screw movably secured by a threaded attachment to said housing, the end of the compression spring not attached to the piston being attached to an end of said regulating screw rather than to the housing, whereby upon moving the regulating screw in one direction the stretch distance of the spring is lengthened thereby to increase the energy which can be loaded onto the spring, and upon moving the screw in the opposite direction the stretch distance of the spring is shortened and thereby decreases the energy which can be loaded onto the spring, these variations in the load given the spring in turn regulating the force of the blows which the piston strikes the patient's tooth.

* * * * *

UNITED STATES PATENT OFFICE
CERTIFICATE OF CORRECTION

Patent No. 3,653,373            Dated April 4, 1972

Inventor(s) Steven C. Batterman

It is certified that error appears in the above-identified patent and that said Letters Patent are hereby corrected as shown below:

On the cover sheet should appear -- [73] Assignee Stress Corporation --.

Signed and sealed this 12th day of December 1972.

(SEAL)
Attest:

EDWARD M. FLETCHER, JR.
Attesting Officer

ROBERT GOTTSCHALK
Commissioner of Patents